(12) United States Patent
Tonar

(10) Patent No.: US 10,768,475 B2
(45) Date of Patent: Sep. 8, 2020

(54) TRANSFLECTIVE FILM FOR ELECTRO-OPTIC ELEMENTS

(71) Applicant: Gentex Corporation, Zeeland, MI (US)

(72) Inventor: William L. Tonar, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 15/956,056

(22) Filed: Apr. 18, 2018

(65) Prior Publication Data

US 2018/0299728 A1 Oct. 18, 2018

Related U.S. Application Data

(60) Provisional application No. 62/486,586, filed on Apr. 18, 2017.

(51) Int. Cl.
| | |
|---|---|
| *G02F 1/1335* | (2006.01) |
| *G02F 1/1339* | (2006.01) |
| *B60R 1/08* | (2006.01) |
| *G02F 1/15* | (2019.01) |
| *G02F 1/17* | (2019.01) |

(52) U.S. Cl.
CPC ...... *G02F 1/133555* (2013.01); *G02F 1/1339* (2013.01); *B60R 1/088* (2013.01); *G02F 1/15* (2013.01); *G02F 1/17* (2013.01); *G02F 1/172* (2013.01); *G02F 2201/343* (2013.01)

(58) Field of Classification Search
CPC .............. G02F 1/133555; G02F 2201/343
See application file for complete search history.

(56) References Cited

U.S. PATENT DOCUMENTS

| | | | | |
|---|---|---|---|---|
| 7,652,736 | B2* | 1/2010 | Padiyath | B32B 17/10018 349/115 |
| 2002/0171794 | A1* | 11/2002 | Nakamura | G02F 1/133555 349/117 |
| 2003/0081161 | A1* | 5/2003 | Ozawa | G02F 1/133536 349/115 |
| 2008/0303991 | A1* | 12/2008 | Wang | G02F 1/133516 349/106 |
| 2009/0231519 | A1* | 9/2009 | Toyama | G02B 5/3083 349/96 |
| 2014/0139902 | A1* | 5/2014 | Baumann | B60R 1/08 359/275 |

\* cited by examiner

Primary Examiner — Jessica M Merlin
(74) Attorney, Agent, or Firm — Price Heneveld LLP; Bradley D. Johnson

(57) ABSTRACT

An electro-optic element includes a first substrate defining first and second surfaces. The second surface includes a first electrically conductive layer. A second substrate defines third and fourth surfaces. The third surface includes a second electrically conductive layer. A primary seal is disposed between the first and second substrates. The seal and the first and second substrates define a cavity therebetween. An electro-optic material is disposed in the cavity. The electro-optic material being variably transmissive such that the electro-optic element is operable between substantially clear and darkened states. A transflective film includes a liquid crystal material. The transflective film has a thickness of from about 6 μm to about 24 μm. An adhesion layer is positioned between the transflective film and the second substrate. An alignment layer is positioned between the transflective film and the adhesion layer.

20 Claims, 3 Drawing Sheets

TRANSFLECTIVE FILM FOR ELECTRO-OPTIC ELEMENTS

CROSS-REFERENCE TO RELATED APPLICATION

This application claims the benefit of and priority to U.S. Provisional Patent Application No. 62/486,586, filed on Apr. 18, 2017, entitled TRANSFLECTIVE FILM FOR ELECTRO-OPTIC ELEMENTS, the entire disclosure of which is hereby incorporated herein by reference.

FIELD OF THE DISCLOSURE

The present disclosure generally relates to electro-optic elements, and more particularly to electro-optic elements incorporating transflective films.

BACKGROUND OF THE DISCLOSURE

Electro-optic elements may be used to reflect and/or transmit light. Accordingly, a single layer which may reflect and transmit different wavelengths of light may be advantageous.

SUMMARY OF THE DISCLOSURE

According to at least one aspect of the present disclosure, an electro-optic element includes a first substrate defining first and second surfaces. The second surface includes a first electrically conductive layer. A second substrate defines third and fourth surfaces. The third surface includes a second electrically conductive layer. A primary seal is disposed between the first and second substrates. The seal and the first and second substrates define a cavity therebetween. An electro-optic material is disposed in the cavity. The electro-optic material being variably transmissive such that the electro-optic element is operable between substantially clear and darkened states. A transflective film includes a liquid crystal material. The transflective film has a thickness of from about 6 μm to about 24 μm. An adhesion layer is positioned between the transflective film and the second substrate. An alignment layer is positioned between the transflective film and the adhesion layer.

According to one aspect of the present disclosure, an electro-optic element includes a first substrate defining first and second surfaces. The second surface includes a first electrically conductive layer. A second substrate defines third and fourth surfaces. The third surface includes a second electrically conductive layer. A primary seal is disposed between the first and second substrates. The seal and the first and second substrates define a cavity therebetween. An electro-optic material is disposed in the cavity. The electro-optic material being variably transmissive such that the electro-optic element is operable between substantially clear and darkened states. A transflective film includes a liquid crystal material. The transflective film includes an average roughness of less than about 18 nm. An adhesion layer is positioned between the transflective film and the second substrate.

According to one aspect of the present disclosure, an electro-optic element includes a first substrate defining first and second surfaces. A second substrate defines third and fourth surfaces. A primary seal is disposed between the first and second substrates. The seal and the first and second substrates define a cavity therebetween. An electro-optic material is disposed in the cavity. The electro-optic material is variably transmissive. A transflective film includes a liquid crystal material. The transflective film includes an average roughness of less than about 18 nm and wherein a waviness of the transflective film is less than about 0.38.

These and other features, advantages, and objects of the present invention will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION OF EMBODIMENTS

Figure 1:
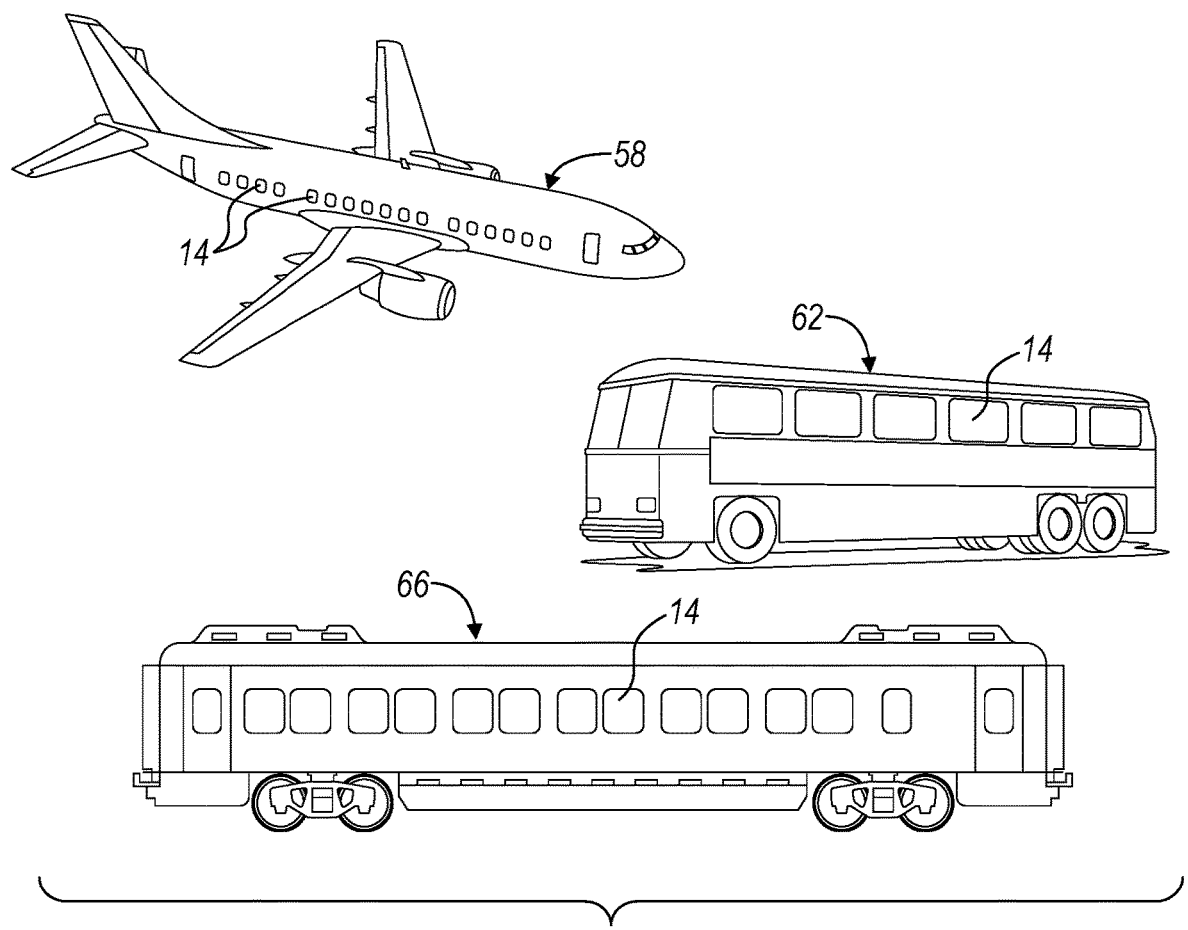
FIG. 1 is a general illustration of multi-passenger vehicles incorporating electro-optic elements.

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring now to FIGS. 1-3B, reference numeral 14 generally designates an electro-optic element. The electro-optic element 14 includes a first substrate 18 defining a first surface 18A and a second surface 18B. The second surface 18B includes a first electrically conductive layer 22. A second substrate 26 defines a third surface 26A and a fourth surface 26B. The third surface 26A includes a second electrically conductive layer 30. A primary seal 34 is disposed between the first and second substrates 18, 26. The seal 34 and the first and second substrates 18, 26 define a cavity 38 therebetween. An electro-optic material 42 is disposed in the cavity 38. The electro-optic material 42 responds to an applied voltage such that the electro-optic element 14 is operable between substantially clear and darkened states. In other words, the electro-optic material 42 may be variably transmissive. A transflective film 46 includes a liquid crystal material. The electro-optic element 14 may further include a liquid crystal alignment layer 50 and/or an adhesion layer 52.

Referring now to FIG. 1, the electro-optic element 14 may be implemented in an aircraft 58, a bus 62 and/or a train car 66. Other vehicles are possible locations for the electro-optic element 14. Further, the electro-optic element may be implemented in buildings and/or other structures.

Figure 2:
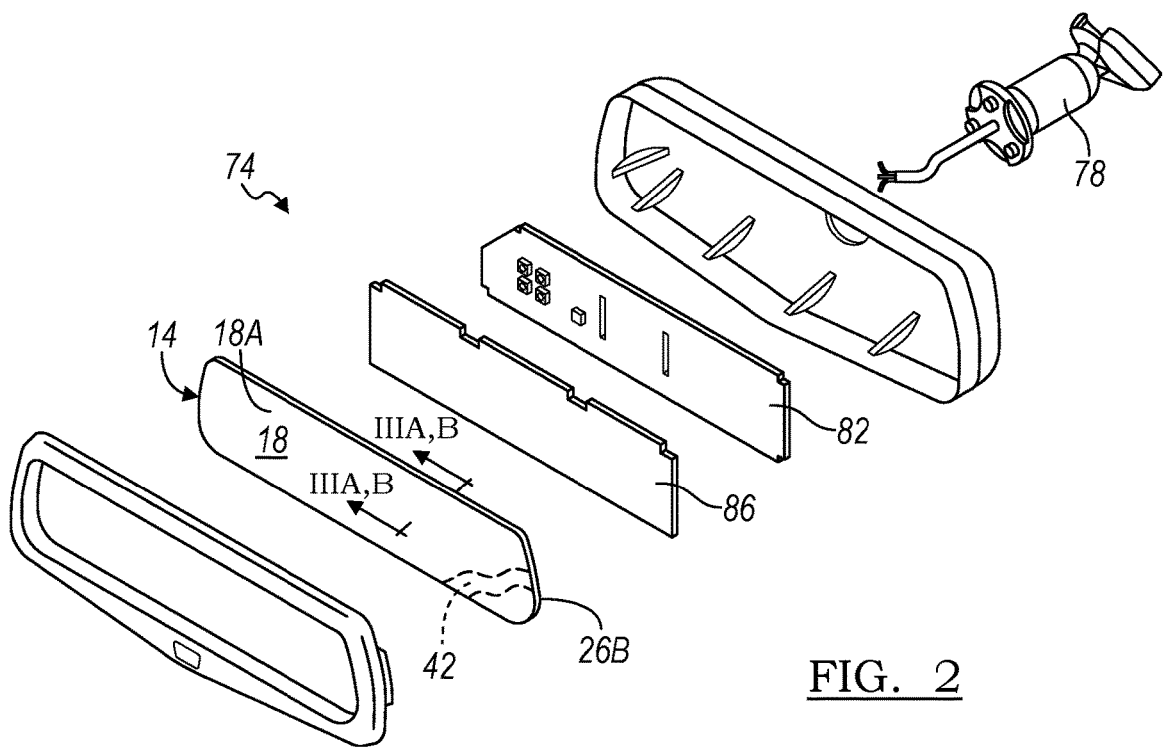
FIG. 2 is a top perspective exploded view of a rearview mirror assembly, according to at least one example.

Referring now to FIG. 2, the electro-optic element 14 may also be applied to a mirror assembly 74. The mirror assembly 74 can be an interior rearview assembly positioned within an interior of a vehicle. When the mirror assembly 74 is an interior rearview assembly, the mirror assembly 74 may be connected to a mount 78, which is adapted to be mounted inside the vehicle in a location proximate to or on a front windshield of the vehicle. It will be understood that the present disclosure is equally applicable to exterior mirrors, as well as other optical assemblies incorporating electro-optic elements 14.

Figure 3A:
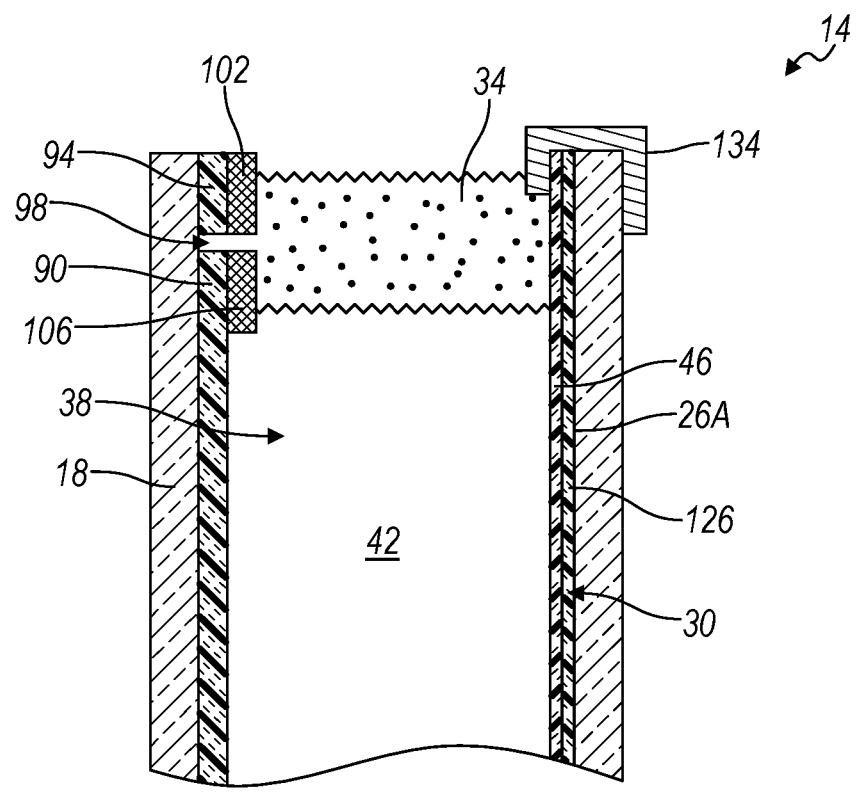
FIG. 3A is a cross-sectional view taken at line IIIA of FIG. 2, according to at least one example.
Figure 3A:
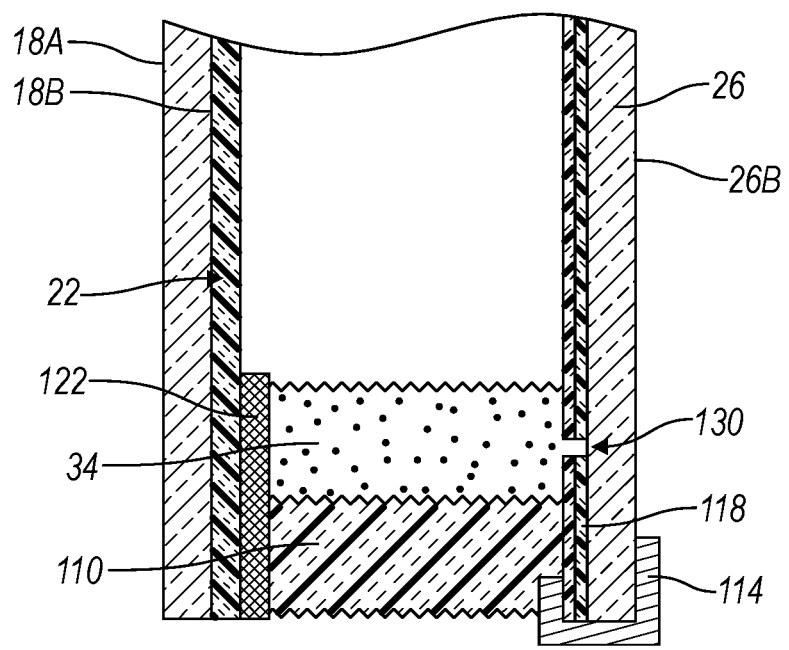

Referring now to FIG. 3A, the first substrate 18 may include a variety of materials transparent in the visible region of the electromagnetic spectrum including soda-lime float glass, EAGLE® glass, alkaline earth boro-aluminosilacate glass, GORILLA® glass, alkali-aluminosilicate glass, chemically strengthened glass, insulated glass, tempered glass, sapphire, optical crystals, diamond, quartz, ceramics, polymers or plastics. The second substrate 26 may include the same materials as the first substrate 18, but may not need to be transparent and may include polymers, metals, glass, ceramics, and/or composites. The first and second substrates 18, 26 may have a thickness from about 0.1 mm to about 3.0 mm, from about 0.5 mm to about 2.2 mm, or from about 0.8 mm to about 1.6 mm. In some examples, the thicknesses of the first and second substrates 18, 26 may differ from one another. Furthermore, a reflector or reflection enhancement layer may be located on either third or fourth surfaces 26A, 26B of the second substrate 26, depending upon the type of electro-optic element 14. The reflector or reflection enhancement layer may cover part, or all of either the third or fourth surfaces 26A, 26B. The first and second substrates 18, 26 may take a variety of shapes including square, rectangular, circular, oblong and combinations thereof. According to various examples, the first and/or second substrates 18, 26 may have a curvature across the length and/or width (i.e., a vertical or horizontal axis). According to various examples, the first substrate 18 may be wider, larger and/or longer, relative to the second substrate 26 such that an overhang is defined around a portion, a majority, or an entirety of the electro-optic element 14. Further, the overhang may vary in width around the perimeter of the electro-optic element 14.

A first conductive electrode portion 90 and a second conductive electrode portion 94 applied to the second surface 18B cooperate to define the first electrically conductive layer 22. The first and second conductive electrode portions 90, 94 are substantially electrically insulated from one another via a first isolation area 98. The first isolation area 98 cooperates with a portion of the primary seal 34 to define the second conductive electrode portion 94 and a second spectral filter portion 102, each substantially electrically insulated from the first conductive electrode portion 90 and a first spectral filter portion 106. This configuration allows for placement of an electrically conductive material 110 adjacent to the primary seal 34. The electrically conductive material 110 may be formed from an electrically conductive material, conductive solder, a conductive epoxy (e.g., silver epoxy), a wire and/or combinations thereof. A first electrical clip 114 is in contact with the electrically conductive material 110 and is further in electrical communication with a third conductive electrode portion 118 and the electro-optic material 42 disposed within the cavity 38. Electrical energy is passed through the first electrical clip 114, through the electrically conductive material 110 and across a third spectral filter portion 122 into the first electrically conductive layer 22.

The third conductive electrode portion 118 and a fourth conductive electrode portion 126 are shown proximate the third surface 26A and are electrically insulated via a second isolation area 130. The third and fourth conductive electrode portions 118, 126 cooperate to define the second electrically conductive layer 30. The second isolation area 130 cooperates with a portion of the primary seal 34 to define the fourth conductive electrode portion 126 that is substantially electrically insulated from the third conductive electrode portion 118. A second electrical clip 134 is in electrical communication with the fourth conductive electrode portion 126 and the electro-optic material 42. The first and second electrically conductive layers 22, 30 may include a transparent conductor such as a transparent metal oxide (e.g., indium-tin-oxide, $F:SnO_2$, ZnO, IZO), carbon (graphene and/or graphite) and/or a conductive metal mesh (e.g., nanowires). In indium-tin-oxide examples, the first and second electrically conductive layers 22, 30 may have a sheet resistance of between about 1 ohms/sq and about 100 ohms/sq.

The primary seal 34 traverses an approximate perimeter of, and is configured to cooperate with, the first and second substrates 18, 26 to define the cavity 38 as substantially hermetic. The cavity 38 may have a spacing between the first and second substrates 18, 26 of less than or equal to about 500 μm, 400 μm, 300 μm, 200 μm, 100 μm, 90 μm, 75 μm, 50 μm, 40 μm, 35 μm, or less than or equal to about 20 μm. The primary seal 34 may be applied to the first or second substrates 18, 26 by methods commonly used in the liquid crystal display (LCD) industry, such as by silk-screening or dispensing. Additional information related to forming a seal between a first and second substrate can be found in U.S. Pat. No. 5,790,298, entitled "METHOD OF FORMING OPTICALLY TRANSPARENT SEAL AND SEAL FORMED BY SAID METHOD," which is hereby incorporated herein by reference in its entirety. The electro-optic material 42 is disposed within the cavity 38, as shown in FIG. 3A. The first and third spectral filter portions 106, 122 extend inboard from the primary seal 34 into the cavity 38 sufficiently far enough to generally conceal the primary seal 34 from a viewer.

The illustrated electro-optic element 14 has the electro-optic material 42 positioned between the first substrate 18 and the second substrate 26 in the cavity 38. According to one example, the electro-optic element 14 may be a liquid crystal device, including a liquid crystal medium (e.g., the electro-optic material 42), configured to attenuate light transmitted through the electro-optic element 14. In another example, the electro-optic element 14 may be a suspended particle device. In some examples, the electro-optic material 42 may be an electrochromic material. In such examples, the electro-optic material 42 may be a solution phase material as disclosed in U.S. Pat. No. 4,902,108 entitled "SINGLE-COMPARTMENT, SELF-ERASING, SOLUTION-PHASE ELECTROCHROMIC DEVICES, SOLUTIONS FOR USE THEREIN, AND USES THEREOF" and U.S. Pat. No.

5,278,693 entitled "TINTED SOLUTION-PHASE ELECTROCHROMIC MIRRORS," commonly assigned to Gentex Corporation, both of which are hereby incorporated in their entirety herein. In other examples, the electro-optic material 42 may be in a solid-state. In such a configuration, the electro-optic element 14 discussed herein may be configured to be transitioned between substantially transparent and substantially darkened states.

Figure 3B:
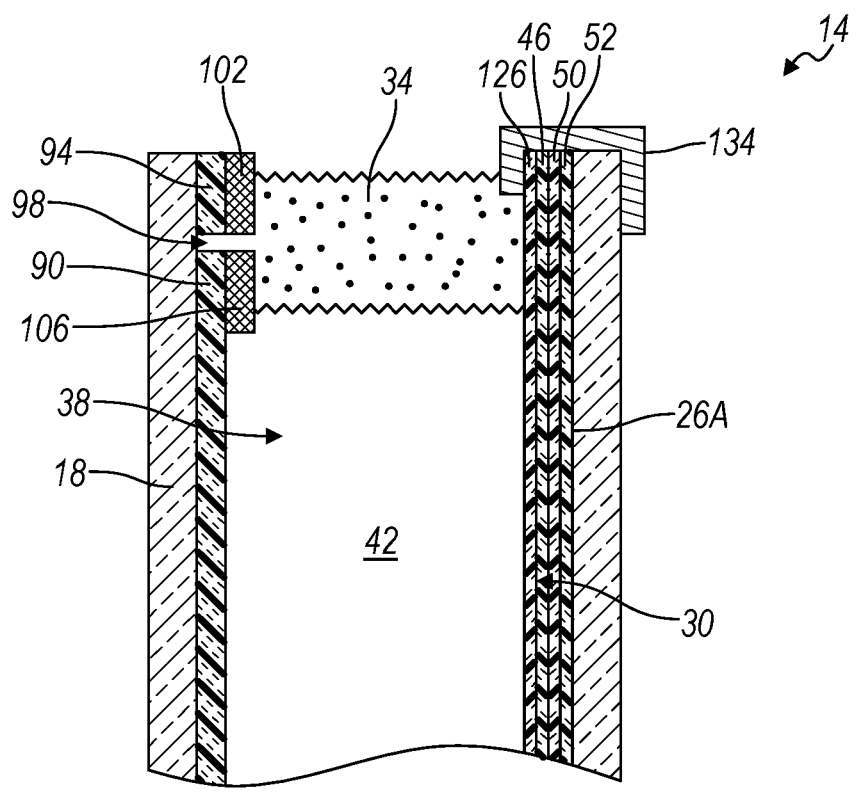
FIG. 3B is a cross-sectional view taken at line IIIB of FIG. 2, according to another example.
Figure 3B:
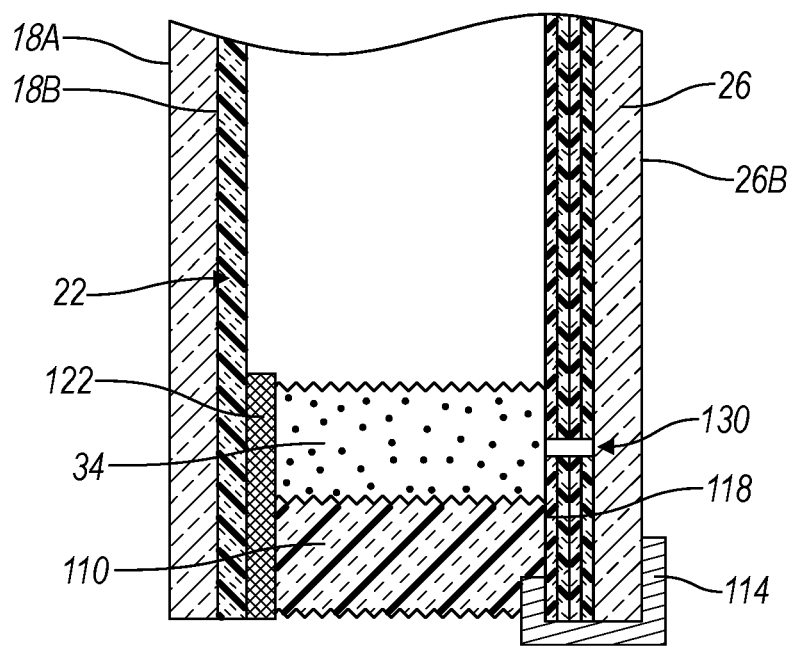

Referring now to FIGS. 3A and 3B, the transflective film 46 may be positioned within the electro-optic element 14 (e.g., proximate the second and/or third surfaces 18B, 26A) and/or on an exterior surface (e.g., the first and/or fourth surfaces 18A, 26B). In examples where the transflective film 46 is positioned on one of the exterior surfaces, an optional overcoat or overmold may be applied to protect the transflective film 46 from environmental exposure. The transflective film 46 can be placed on both the first and second substrates 18, 26. In such an example, the film 46 on the first substrate 18 may reflect one type of polarization and the film 46 on the second substrate 26 may reflect a second type of polarization. In examples where the transflective film 46 is positioned within the electro-optic element 14, the film 46 may be in contact with at least one of the first and second substrates 18, 26 (e.g., positioned on the second surface 18B and/or the third surface 26A) the first electrically conductive layer 22, the second electrically conductive layer 30, the alignment layer 50 and/or the adhesion layer 52. The first and/or second electrically conductive layers 22, 30 may be positioned between the transflective film 46 and the respective first and second substrates 18, 26 or the first and/or second electrically conductive layers 22, 30 can be adjacent to and in electrical contact with electro-optic material 42. In the depicted example of FIG. 3A, the transflective film 46 is in contact with the electro-optic material 42 and the second electrically conductive layer 30. In such an example, the electro-optic material 42 may be a liquid crystal, or a field effect, material. In the depicted example of FIG. 3B, the alignment layer 50 and the adhesion layer 52 are positioned between the transflective film 46 and the third surface 26A, but it will be understood that the film 46 may be positioned directly on the third surface 26A. Further, it will be understood that the construction and ordering of the alignment layer 50, the adhesion layer 52 and the transflective film 46 may be equally applied to the second surface 18B. The transflective film 46 is depicted as extending between the seal 34 and the second substrate 26, but it will be understood that the transflective film 46 may only extend between the seal 34.

The transflective film 46 may be composed of a plurality of layers having different optical properties (e.g., reflectance, transmission and scattering) as explained in greater detail below. Further, the optical properties of the transflective film 46 may vary across, or within, the transflective film 46. For example, a first portion of the transflective film 46 may be configured to scatter or reflect a specific wavelength band of light while a second portion may not. The transflective film 46 may include layers that reflect one polarization of light and transmit a second polarization of light. The transflective film 46 may contain a layer or layers that act as a quarter wave plate that will convert linear polarized light to circularly polarized light or vice versa. The transflective layer 46 may be configured to reflect both polarizations of a specific wavelength band of light. The transflective layer 46 could be configured to scatter a specific wavelength band of light. The layers can be composed of a material that has liquid crystalline properties. In such examples, the liquid material forms a solid film. In examples of the transflective film 46 incorporates the liquid crystal material, the liquid crystal material may be a cholesteric liquid crystal material. In other words, the liquid crystal polymers may have a helical structure known as a pitch. In such examples, the transflective film 46 may have a pitch from 250 nm to about 400 nm.

If the transflective film 46 is used as a specular reflector (e.g., for example in an automatic mirror application) it may be advantageous that the reflected image is substantially preserved and free from undesirable distortion. It may be difficult to laminate a pre-formed film to a substrate without incorporating undesirable distortion. As such, casting the transflective film 46 directly onto an optically acceptable substrate such as glass may be advantageous. According to various examples, the liquid crystal examples of the transflective film 46 may be cast or coated directly onto one of the first and/or second substrates 18, 26, or may be cast or coated onto any of the aforementioned layers (e.g., the first and second electrically conductive layers 22, 30, alignment layer 50 and/or adhesion layer 52). In liquid crystal examples of the transflective film 46, the film 46 may be composed of multiple layers (e.g., each cast or coated separately in sequence). The transflective film 46 may have a thickness of from about 6 μm and about 24 μm, or from about 8 μm and about 16 μm. In a specific example, the transflective film 46 may have a thickness of about 12 μm. The transflective film 46 may have an arithmetic average surface roughness value from about 0.1 nm to about 70 nm, or from about 0.2 nm to about 50 nm, or from about 0.5 nm to about 20 nm. In specific examples, the arithmetic average surface roughness of the film 46 may be less than or equal to about 18 nm, 15 nm, 10 nm or less than or equal to about 5 nm. The transflective film 46 may have waviness. The waviness may be presented as a measurement of the maximum difference (e.g., in nm) between a peak and a valley of the transflective film 46 which is divided by the distance (e.g., in nm) between the peak and the valley. Accordingly, the waviness value may be unitless. The waviness may have a value from about 0.01 to about 0.9, or from about 0.1 to about 0.5. In specific examples, the waviness of the film 46 may be less than or equal to about 0.38, 0.2, 0.15 or less than or equal to about 0.1.

The transflective film 46 may be composed of a plurality of layers, each having different or the same optical properties (e.g., wavelength band of reflection, absorption, scattering and/or transmission). The transflective film 46 may have between 1 and about 10 layers. In a specific example, the film 46 may include four layers. It will be understood that each layer may contain sublayers which aid in the polarization, reflection, scattering, transmission and/or absorption of light. Each of the sublayers may have a thickness of from about 0.5 μm and about 5.0 μm. Further, it will be understood that the transflective film 46 may be used in conjunction with a quarter-wave plate to convert linear polarized light to circularly polarized light or vice versa.

The transflective layer 46 may conform to a variety of environmental tests. For example, the transflective film 46 may survive temperature ranges from about −40° C. to about 85° C. for up to and beyond 1000 hours. Further, the transflective film 46 may survive high humidity tests (e.g., 60° C. with 90% relative humidity). The transflective layer 46 may resist thermal shock (e.g., a temperature swing from about −40° C. to about 85° C. over the course of about 30 minutes). The transflective layer 46 may also survive a variety of ultraviolet light tests.

According to various examples, the transflective film 46 may be configured to reflect, transmit, scatter and/or absorb various polarizations and/or wavelengths of light. The transflective film 46 may have a reflectance of one or more wavelength bands of the electromagnetic spectrum and/or polarizations. For example, the transflective film 46 may reflect a specific color or band (e.g., ultraviolet, visible, near-infrared, infrared) of electromagnetic radiation or type of polarization (e.g., vertical, horizontal, clockwise circular and/or counterclockwise circular). The transflective film 46 may reflect greater than or equal to about 1%, 5%, 10%, 20%, 30%, 40%, 50%, 60%, 70%, 80%, 90%, or greater than or equal to about 99% of one or more wavelength bands of the electromagnetic spectrum or types of polarization.

The transflective film 46 may have a transmittance of one or more wavelength bands of the electromagnetic spectrum and/or polarizations. For example, the transflective film 46 may transmit a specific color or band of electromagnetic radiation or a plurality of colors and bands. Further, the transflective film 46 may transmit one or more types of polarization (e.g., vertical or s polarization, horizontal or p polarization, clockwise circular polarization and/or counterclockwise circular polarization). It will be understood that the transflective film 46 may also convert one polarization (e.g., linear) to another polarization (e.g., circular). The transflective film 46 may transmit or convert greater than or equal to about 1%, 5%, 10%, 20%, 30%, 40%, 50%, 60%, 70%, 80%, 90%, or greater than or equal to about 99% of one or more wavelength bands of the electromagnetic spectrum or types of polarization.

The transflective film 46 may be configured to scatter one or more wavelength bands of the electromagnetic spectrum or types of polarization. For example, the transflective film 46 may scatter a specific polarization or color or band (e.g., ultraviolet, visible, near-infrared, infrared) of electromagnetic radiation. The transflective film 46 may scatter greater than or equal to about 1%, 5%, 10%, 20%, 30%, 40%, 50%, 60%, 70%, 80%, 90%, or greater than or equal to about 99% of one or more polarizations and/or wavelength bands of the electromagnetic spectrum. It will be understood that the transflective film 46 may be capable of reflecting, scattering, absorbing and/or transmitting different polarization and wavelengths of light simultaneously. For example, the transflective film 46 may be configured to reflect and/or scatter red clockwise polarized light. In examples where the transflective film 46 includes multiple layers or sections, each of the layers or sections may reflect and/or scatter a different combination of band and polarization of light. For example, a first layer or area of the transflective film 46 may be configured to reflect or scatter yellow clockwise polarized light while a second layer or area may be configured to reflect or scatter green counterclockwise polarized light. As such, the transflective film 46 may be oriented to cause color mixing between reflected, scattered and/or transmitted light.

The adhesion layer 52 may include one or more adhesion promoting materials to secure the transflective film 46 and/or the alignment layer 50 to the first and/or second substrates 18, 26. The adhesion promoting materials of the adhesion layer 52 may include an optical coupling adhesive, silanes, a primer and/or other adhesive materials. The adhesion layer 52 may be applied via dip coating, solution coating, spray coating and/or other application methods. The application method and material of the transflective film 46 that are chosen may form a film that preserves the desirable optical properties of the substrate (e.g., one of the first and/or second substrates 18, 26) and minimally contribute undesirable distortion to the image reflected from the transflective film 46. The adhesion layer 52 may have a thickness of less than or equal to about 20 µm, 10 µm or less than or equal to about 5 µm. The adhesion layer 52 may follow the optical surface of the surface it is positioned on (e.g., the first or second substrates 18, 26) so as to not interfere with the surface's optical flatness.

The alignment layer 50 is depicted as positioned between the transflective film 46 and the adhesion layer 52, but it will be understood that the alignment layer 50 may be applied directly to the first and/or second substrates 18, 26. The alignment layer 50 may be composed of a material configured to align molecules within liquid crystal examples of the transflective film 46 or the electro-optic material 42. In a specific example, the alignment layer 50 may induce homogeneous and/or homeotropic liquid crystal alignment and be polymer based like polyimide or polyvinyl alcohol or a surface treatment like an organic silane coating which may be doped. The alignment layer 50 may be used to provide the liquid crystal molecules with a specific pre-tilt angle. It will be understood that any material capable of providing a specific pre-tilt angle or surface orientation to the liquid crystal molecules may be utilized without departing from the teachings provided herein.

Use of the present disclosure may offer a variety of advantages. First, by casting the transflective film 46 directly onto the first and second substrates 18, 26, onto the second electrically conductive layer 30, the alignment layer 50 and/or the adhesion layer 52, use of transfer sheets which transport the transflective film 46 from a manufacturing site to the electro-optic element 14 may be eliminated. Further, the direct casting of the transflective film 46 onto the electro-optic element 14 may eliminate a costly and time-intensive lamination process which may also induce defects which can reduce reflected image quality. Second, as the transflective film 46 may reflect, scatter, transmit and/or absorb various polarizations and wavelengths of light, the transflective film 46 may be advantageously used in a variety of applications to reflect undesired wavelengths of light (e.g., infrared from a vehicle application), adjust a transmitted color (e.g., reflect or scatter undesired colors) and the like. Third, the transflective film 46 may be incorporated inside or on an exterior of the electro-optic element 14 which may be advantageous in providing design flexibility to the electro-optic element 14 and also protect the film 46 from mechanical and environmental exposure change. Fourth, electro-optic elements 14 including the transflective film 46 may be used in conjunction with polarized eyewear.

EXAMPLES

Referring now to Table 1, provided are surface roughness and surface waviness values for a plurality samples of films (e.g., the transflective film 46) positioned on glass plates (e.g., one of the first and second substrates 18, 26). The roughness and surface waviness values of the films were measured by white light interferometry at 10× magnification using an instrument similar to a Zygo ZeGage Plus.

The first sample is a base bare glass plate used for lamination samples. The second sample is a cholesteric based reflective polarizer film laminated onto glass with a thin liquid acrylic adhesive layer. The third sample is a cholesteric based reflective polarizer film laminated onto glass with a 0.001" thick acrylic pressure sensitive adhesive layer and the fourth sample is a cholesteric based reflective polarizer film laminated onto glass with a 0.002" thick acrylic pressure sensitive adhesive layer. The fifth sample is a bare glass plate used for casting examples. The sixth sample is the glass substrate having single 1 um thick polymer film solution (e.g., the liquid crystal examples of the transflective film 46) cast onto glass by a spin process. The seventh sample is a 1 um thick film followed by a 4 um thick film both cast onto glass by a spin process.

From the data provided in Table 1, it can be shown that the surfaces of films cast onto a high-quality optical substrate will tend to replicate the high-quality surface of the optical substrate more closely than solid films that are laminated onto glass. As such, casting of optical coatings onto the plates may be advantageous in decreasing an arithmetic average surface roughness as well as waviness of the resulting coatings.

TABLE 1

| Sample | Material | Roughness (Ra) | Waviness (PV/wavelength) |
|---|---|---|---|
| 1 | Base Glass (Lam) | 1.10 nm | 0.09 |
| 2 | Laminated Liquid Acrylic | 20.16 nm | 0.62 |
| 3 | Laminated 1 mil PSA | 27.51 nm | 0.41 |
| 4 | Laminated 2 mil PSA | 57.6 nm | 0.83 |
| 5 | Base Glass (Cast) | 0.79 nm | 0.021 |
| 6 | One Cast Coating | 1.02 nm | 0.048 |
| 7 | Two Cast Coatings | 6.28 nm | 0.144 |

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. An electro-optic element comprising:
  a first substrate defining first and second surfaces, wherein the second surface comprises a first electrically conductive layer;
  a second substrate defining third and fourth surfaces, wherein the third surface comprises a second electrically conductive layer;
  a primary seal disposed between the first and second substrates, wherein the seal and the first and second substrates define a cavity therebetween;

an electro-optic material disposed in the cavity, the electro-optic material being variably transmissive such that the electro-optic element is operable between substantially clear and darkened states;

a transflective film comprising a liquid crystal material, wherein the transflective film comprises an average roughness of less than about 18 nm; and an adhesion layer positioned between the transflective film and the second substrate, wherein the transflective film is directly in contact with the second electrically conductive layer.

2. The electro-optic element of claim 1, wherein the electro-optic material is an electrochromic material.

3. The electro-optic element of claim 1, wherein the transflective film is configured to reflect circularly polarized light.

4. The electro-optic element of claim 3, further comprising:

an alignment layer positioned between the transflective film and the adhesion layer.

5. The electro-optic element of claim 1, wherein a waviness of the transflective film is less than about 0.20.

6. The electro-optic element of claim 1, wherein the transflective film comprises a cholesteric liquid crystal material.

7. An electro-optic element comprising:

a first substrate defining first and second surfaces;

a second substrate defining third and fourth surfaces;

a primary seal disposed between the first and second substrates, wherein the seal and the first and second substrates define a cavity therebetween;

an electro-optic material disposed in the cavity, wherein the electro-optic material is variably transmissive; and a transflective film comprising a liquid crystal material, wherein the transflective film comprises an average roughness of less than about 18 nm and wherein a waviness of the transflective film is less than about 0.38.

8. The electro-optic element of claim 7, further comprising:

an adhesion layer positioned between the transflective film and the second substrate.

9. The electro-optic element of claim 8, wherein the adhesion layer comprises a silane material.

10. The electro-optic element of claim 9, wherein the transflective film comprises a plurality of layers, further wherein each of the layers is configured to reflect a different wavelength band of light.

11. The electro-optic element of claim 10, wherein the transflective film comprises a cholesteric liquid crystal material.

12. The electro-optic element of claim 11, wherein the transflective film comprises at least one layer configured to one of (a) convert linear polarized light to circular polarized light or (b) convert circular polarized light to linear polarized light.

13. An electro-optic element comprising:

a first substrate defining first and second surfaces, wherein the second surface comprises a first electrically conductive layer;

a second substrate defining third and fourth surfaces, wherein the third surface comprises a second electrically conductive layer;

a primary seal disposed between the first and second substrates, wherein the seal and the first and second substrates define a cavity therebetween;

an electro-optic material disposed in the cavity, the electro-optic material being variably transmissive such that the electro-optic element is operable between substantially clear and darkened states;

a transflective film comprising a liquid crystal material, wherein the transflective film has a thickness of from about 6 µm to about 24 µm and a waviness of less than about 0.9;

an adhesion layer positioned between the transflective film and the second substrate; and an alignment layer positioned between the transflective film and the adhesion layer.

14. The electro-optic element of claim 13, wherein the transflective film comprises a cholesteric liquid crystal material.

15. The electro-optic element of claim 14, wherein the transflective film comprises at least one layer configured to one of (a) convert linear polarized light to circular polarized light or (b) convert circular polarized light to linear polarized light.

16. The electro-optic element of claim 14, wherein the transflective film comprises a plurality of layers, and wherein a first one of the plurality of layers is configured to reflect, absorb, scatter, or transmit a first band and polarization of light and a second one of the plurality of layers is configured to reflect, absorb, scatter, or transmit a second band and polarization of light that is different than the first band and polarization of light.

17. The electro-optic element of claim 6, wherein the transflective film comprises at least one layer configured to one of (a) convert linear polarized light to circular polarized light or (b) convert circular polarized light to linear polarized light.

18. The electro-optic element of claim 6, wherein the transflective film comprises a plurality of layers, and wherein a first one of the plurality of layers is configured to reflect, absorb, scatter, or transmit a first band and polarization of light and a second one of the plurality of layers is configured to reflect, absorb, scatter, or transmit a second band and polarization of light that is different than the first band and polarization of light.

19. The electro-optic element of claim 13, wherein the transflective film comprises an average roughness of less than about 18 nm.

20. The electro-optic element of claim 13, wherein the transflective film comprises a plurality of sublayers, wherein each of the sublayers has a thickness of from about 0.5 µm to about 5.0 µm.

* * * * *